(12) United States Patent
Sivells et al.

(10) Patent No.: US 6,279,838 B1
(45) Date of Patent: Aug. 28, 2001

(54) SPRAYER DOLLY

(75) Inventors: Michael D. Sivells; Barbara A. Sivells, both of Fairdale, KY (US)

(73) Assignee: Empire Spraying Systems, Inc., Fairdale, KY (US)

(*) Notice: Subject to any disclaimer, the term of this patent is extended or adjusted under 35 U.S.C. 154(b) by 0 days.

(21) Appl. No.: 09/484,122

(22) Filed: Jan. 13, 2000

Related U.S. Application Data

(60) Provisional application No. 60/116,190, filed on Jan. 15, 1999.

(51) Int. Cl.[7] .............................. A01G 25/09; B05B 9/04
(52) U.S. Cl. ............................................. 239/146; 239/322
(58) Field of Search .................................. 239/146, 147, 239/722, 198, 302, 329, 332

(56) References Cited

U.S. PATENT DOCUMENTS

| | | | |
|---|---|---|---|
| 3,680,786 | * | 8/1972 | Levy ....................................... 239/146 |
| 3,940,065 | * | 2/1976 | Ware et al. ............................ 239/146 |
| 4,135,669 | * | 1/1979 | Bridges ................................. 239/373 |
| 4,828,177 | * | 5/1989 | Schuitemaker ....................... 239/165 |
| 4,848,659 | * | 7/1989 | Tadych .............................. 239/146 X |
| 4,865,255 | * | 9/1989 | Luvisotto .............................. 239/149 |
| 4,967,960 | * | 11/1990 | Futrell .............................. 239/332 X |
| 5,064,123 | * | 11/1991 | Aiello et al. ......................... 239/706 |
| 5,419,497 | * | 5/1995 | Warrington ...................... 239/198 X |
| 5,622,319 | * | 4/1997 | Babb et al. ....................... 239/198 X |
| 5,752,661 | * | 5/1998 | Lewis .............................. 239/332 X |
| 5,816,499 | * | 10/1998 | Christiansen ......................... 239/198 |
| 6,047,898 | * | 4/2000 | Cox .................................. 239/146 X |
| 6,070,808 | * | 6/2000 | Kildow ............................. 239/147 X |

* cited by examiner

Primary Examiner—Lesley D. Morris
(74) Attorney, Agent, or Firm—Carrithers Law Office; David W. Carrithers

(57) ABSTRACT

This invention relates generally to a lightweight dolly for transporting spray equipment including a container of liquid, battery power pack and optional charger unit, hose reel, and spray gun.

59 Claims, 7 Drawing Sheets

Ⓐ, Ⓑ & Ⓒ are contacts of relays

| Rotary switch | Relays | | |
|---|---|---|---|
| | Ⓐ | Ⓑ | Ⓒ |
| Off | Open | Open | Open |
| Charger | Close | Open | Open |
| AC Operator | Open | Open | Close |
| Battery Operator | Open | Close | Open |

SPRAYER DOLLY

This application claims priority from U.S. Provisional Patent Application Ser. No. 60/116,190 filed on Jan. 15, 1999, incorporated by reference herein.

BACKGROUND OF THE INVENTION

1. Technical Field

This invention relates generally to a lightweight dolly for transporting spray equipment including a container of liquid, battery power pack and optional charger unit, hose reel, and spray gun.

2. Summary of the Invention

The instant invention is used for applying chemicals, detergents, and sealers to decks, houses, driveways, fleet vehicles, and the like.

The handle and frame are constructed of hollow PVC tubing reinforced with steel. The top plate, gussets, pump box, battery box, and bucket holder are constructed of high density plastic which is welded together with PVC weld. The components are heated, bent and placed into a wooden mold and formed into shape and then cooled.

The instant invention has ten inch pneumatic wheels with a front locking swivel caster that allows for easy maneuvering in rocks and grass. The hose reel is retractable and is connected to a chemical resistant pump. The pump can run AC or DC with the battery charging system that requires a battery, preferably a marine battery, or it can be plugged into an outlet. Moreover a retractable electric cord may be mounted to the frame as well. The spray gun is light weight, and is attached to a 12 inch aluminum lance and an adjustable cone nozzle. This special nozzle allows the user to change the flow rate of the product that is being applied for a particular application. The entire unit of the preferred embodiment weights only 32 pounds.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

The present invention is fabricated from lightweight plastic materials; however it is contemplated that one or more structural frame support members may be molded or formed integrally to reduce the number of frame members. Moreover, the frame members may be fabricated with removable snaps, projections and insertion points to provide for easy and quick assembly by the user whereby the individual parts fit into cooperative engagement with one another.

Figure 8:
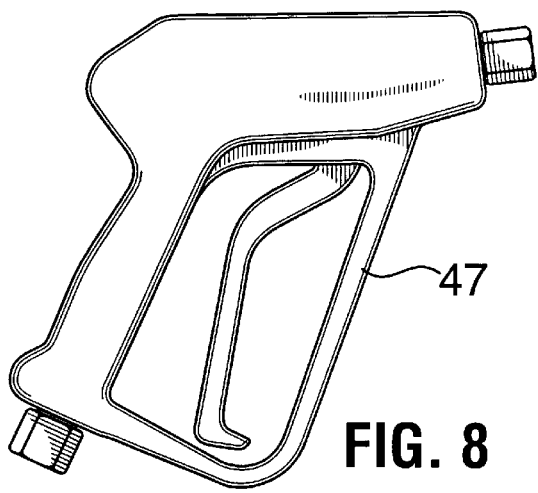
FIG. 8 is a side view showing the handle of the spray gun of the present invention.

One preferred embodiment of the present invention comprises a spray dolly 1 as shown best in FIGS. 1–7 having a movable base and frame handle, wherein the base is generally rectangular tubular base frame 20 composed of plastic pipe or tubing joined together forming front 21 and side longitudinal members 22 supported by pneumatic tires 10 and wheels via an steel axle 13 as shown best in FIG. 8 extending normal to and through the rear length 24 of base frame 20 tubing. The frame and handle are preferably high density steel reinforced plastic to provide chemical resistance to corrosion. A pair of ninety degree elbows 26 made of plastic join the distal ends of the horizontal side longitudinal members 22 with the distal ends of a pair of vertical longitudinal members 28 formed of plastic pipe or tubing. At about waist level of the user, the tubes are bent at a slight angle forming elbows 30 extending backward toward the user at an obtuse angle of about 130 degrees wherein a short pair of angled tubular members 32 extend outwardly toward the user. A horizontal tubular member 34 joints the distal ends of the short angled tubular members 32 forming a handle spaced apart and extending outward a selected distance from the rear of the frame 20.

The preferred plastic is ABS, (acrylonitrile butydiene styrene); however, polypropylene, graphite fiber, nylon, polyvinylchloride or other polymers could be utilized for fabrication of the structural members to maximize corrosion resistance to the chemical applications.

In the preferred embodiment reinforcement support plates 36 extend from the bottom portion of the vertical longitudinal members 28 to join the upper surface of the base frame side members 22. A length of straight pipe may be inserted into the horizontal side members 22 and/or the vertical side members 28 to add structural rigidity to the frame; however, this is not a required feature of the structure. Moreover, the lengths of pipe could be joined at the elbow.

A flat sheet 11 of material is attached to the upper surface of the frame base members 21, 22 forming a base support surface. At least one swivel dolly wheel 12 is attached to the underneath surface of the base 20. The swivel dolly 12 of the preferred embodiment includes a stop means such as a lever to bias the wheel 12 in locked or unlocked position permitting rotational movement thereof.

Figure 9:
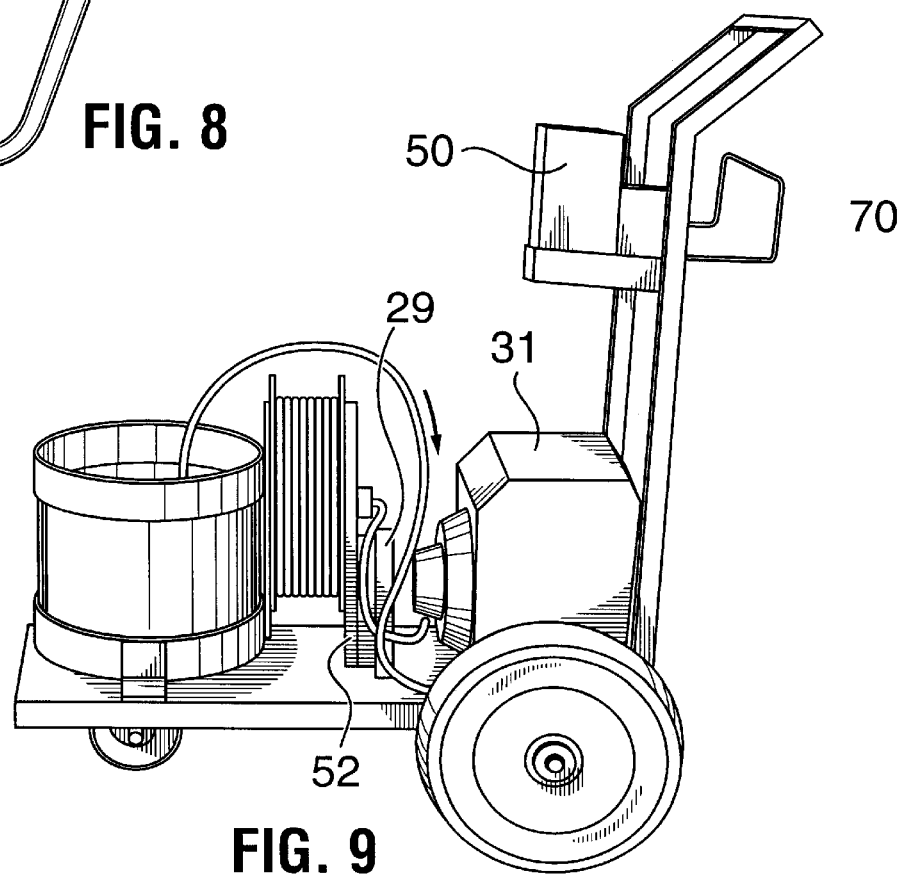
FIG. 9 is a perspective side view of another embodiment of the present invention.

A novel feature of the preferred embodiment is the formation of a circular lip container or bucket support 15 extending upward from the front portion of the frame base support sheet 11 to hold a five gallon bucket of spray solution. The bucket 2 is securely held in the sprayer base 11 providing a mobil unit which enables the user to switch buckets rapidly or remove the bucket for changeover, cleanup, or other preparations. A retractable hose reel 3 such as shown in FIGS. 1–8 and described in detailed exploded view in FIGS. 9–11. A manual crank hose reel may also be employed in the instant invention as well. The hose reel is fabricated from 11 gauge steel supports and utilizes self aligning bearings on both sides. The hose can be comprised of any polymer; however, VITON is preferred due to its chemical resistance and ability to withstand pressures up to 150 psig. An extra hose support 70 may be attached to the rear of the frame.

Figure 1:
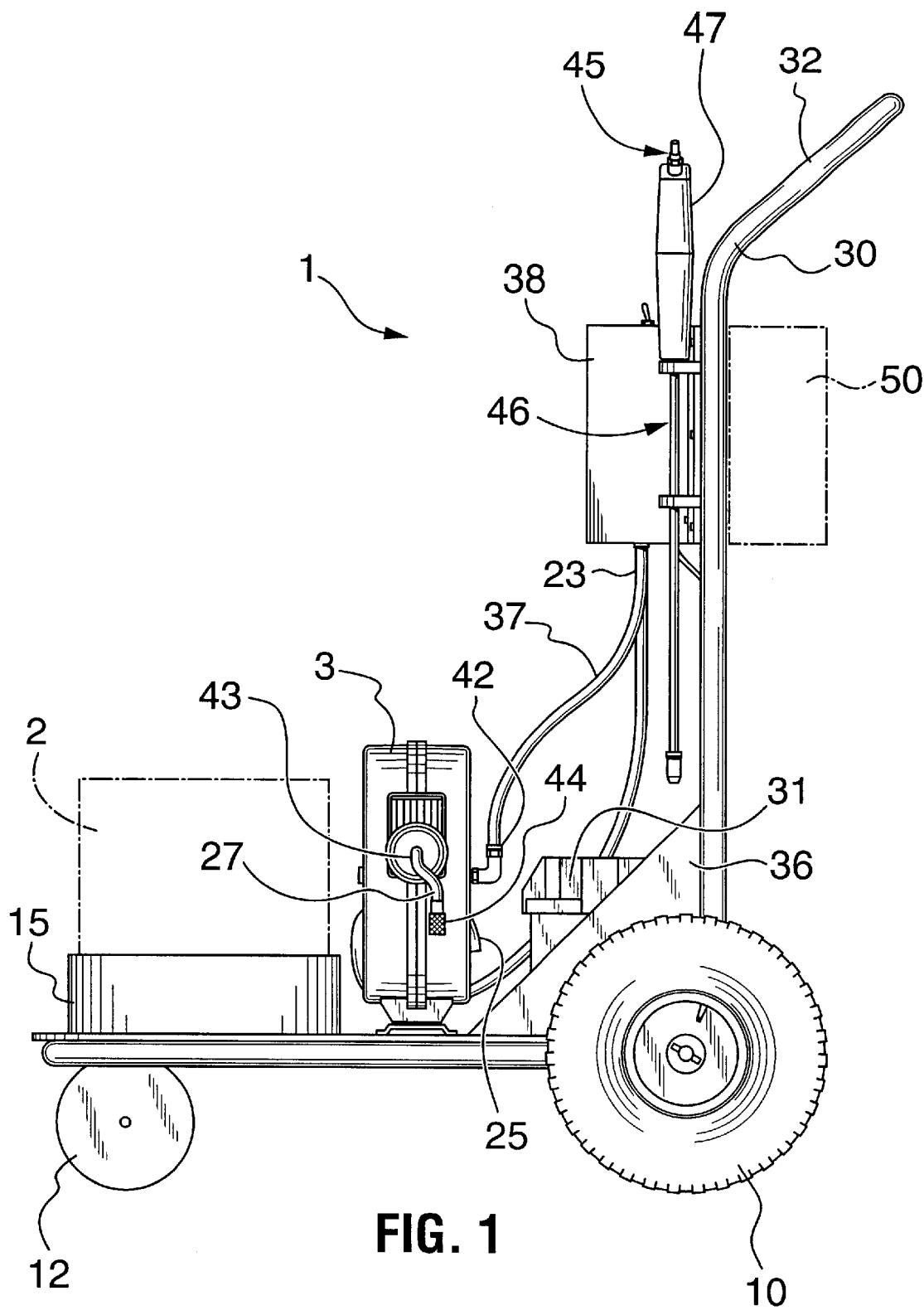
FIG. 1 is a left side view of the present invention.
Figure 2:
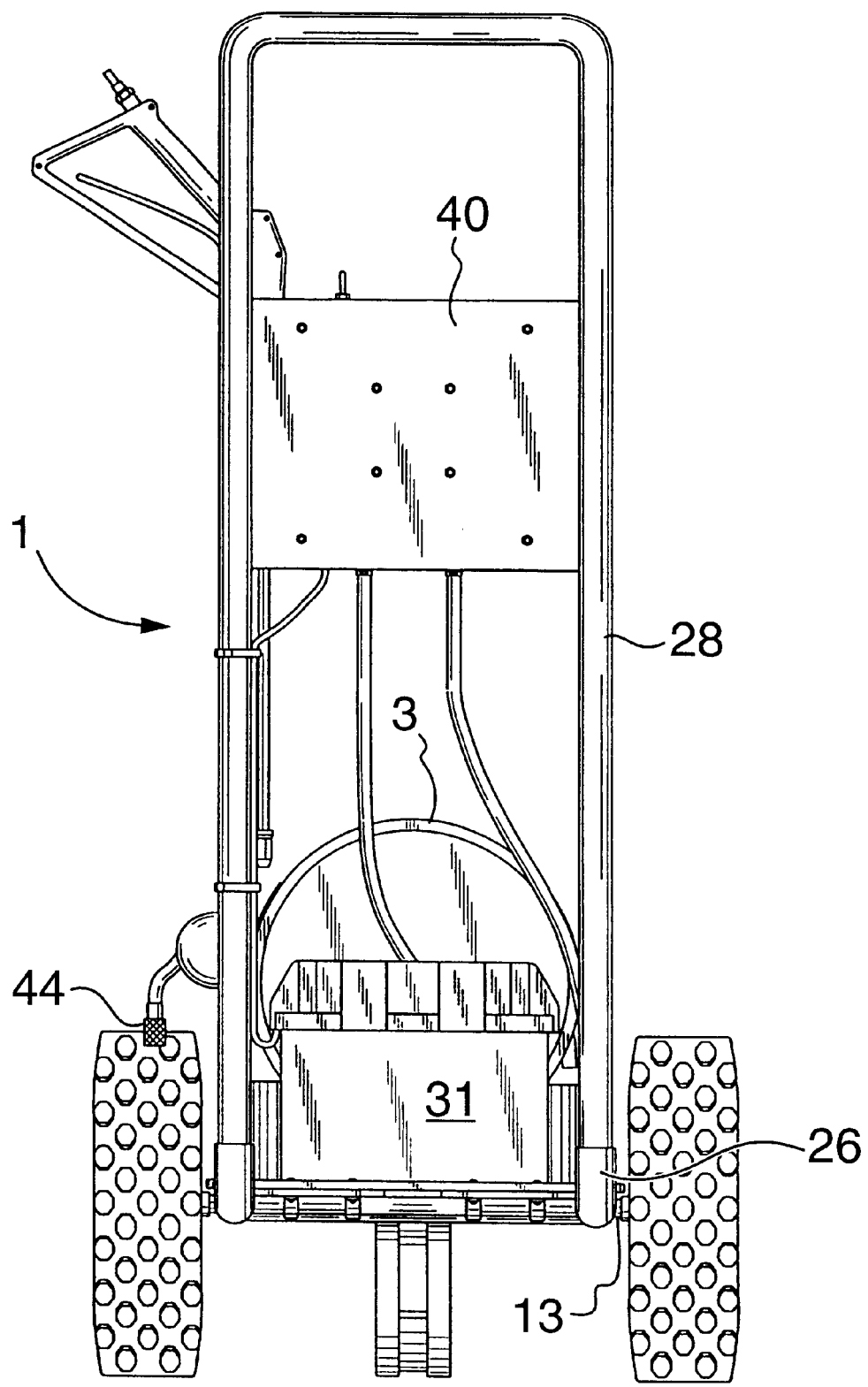
FIG. 2 is a rear end view thereof.
Figure 3:
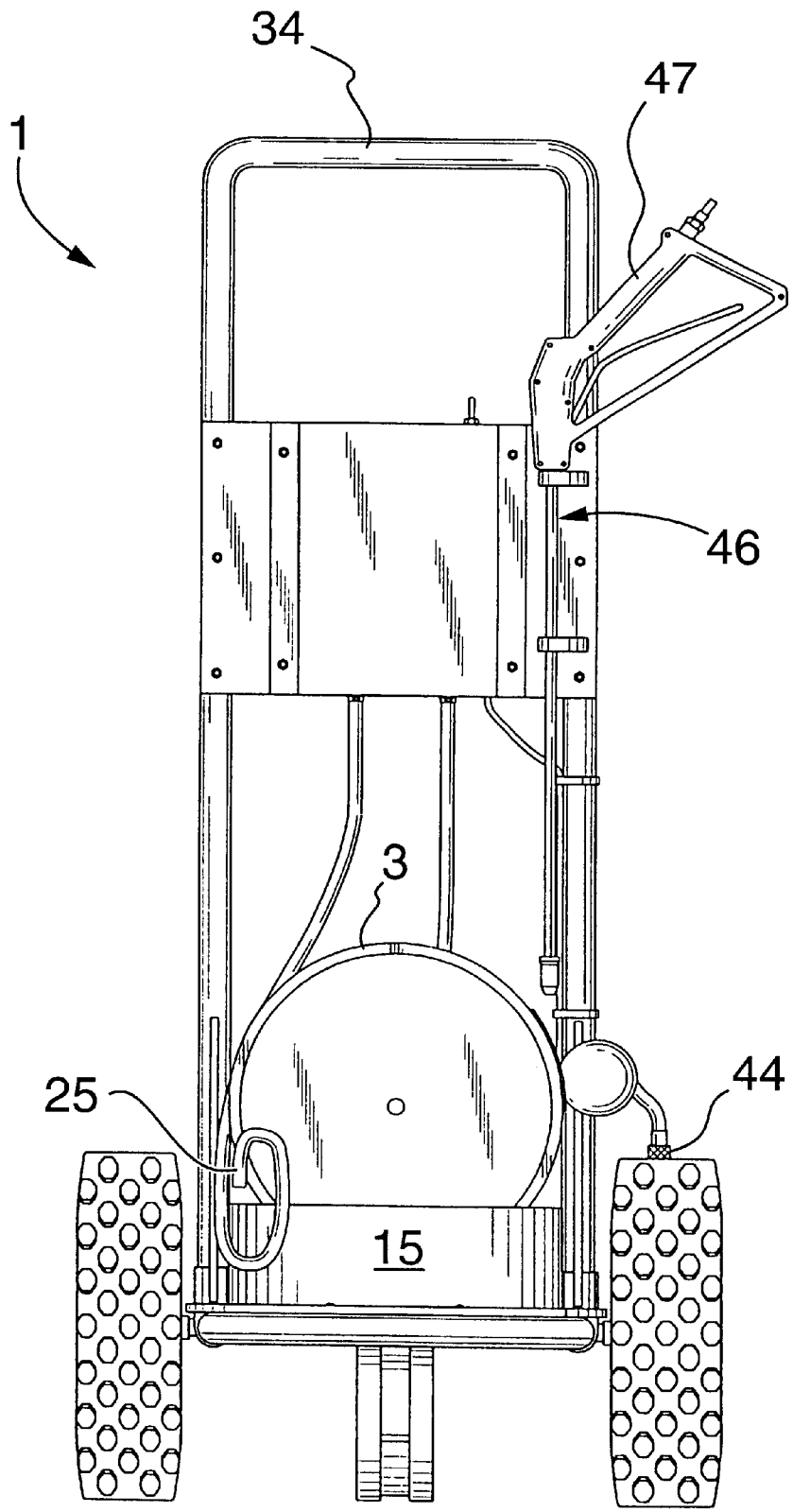
FIG. 3 is a front end view thereof.
Figure 4:
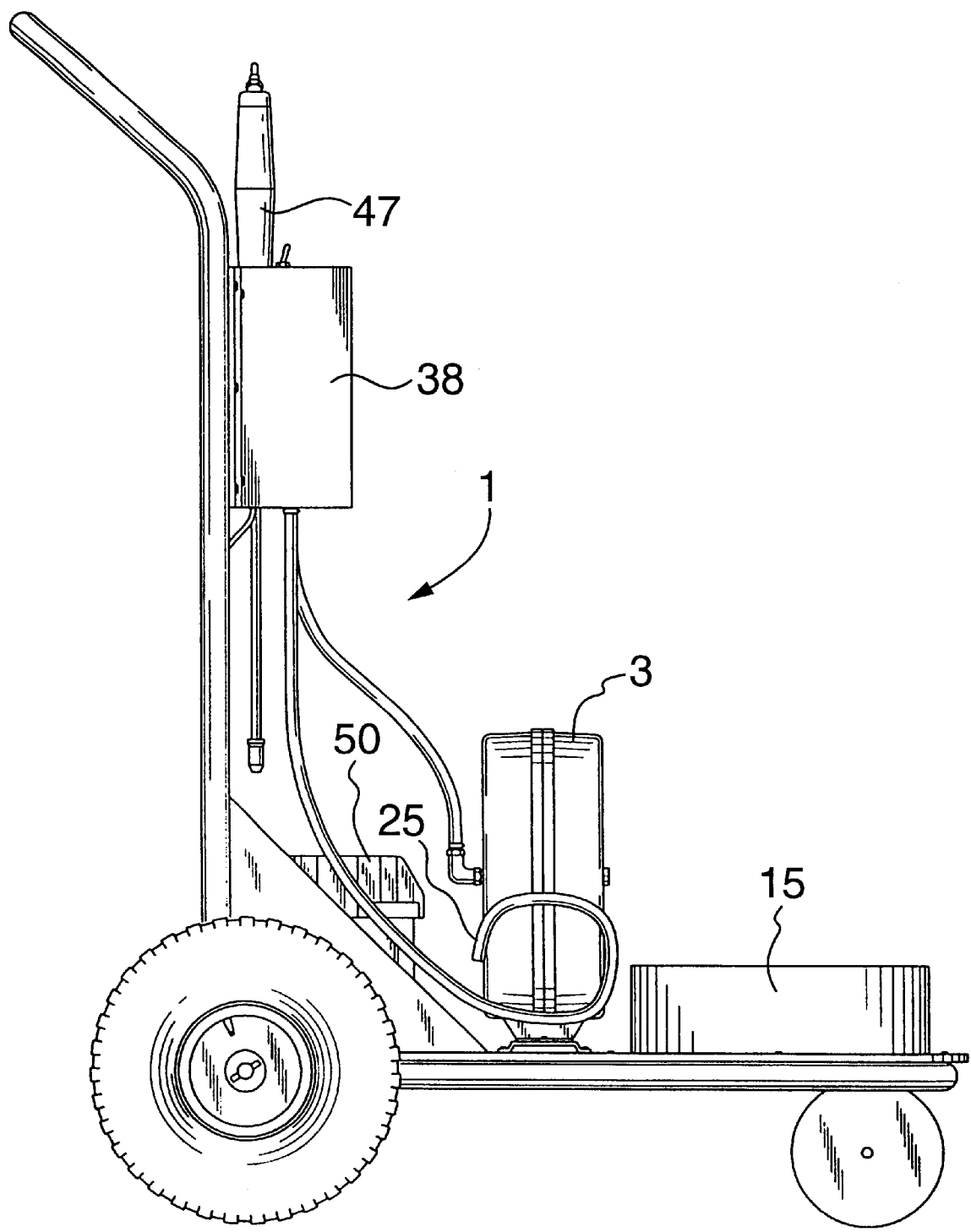
FIG. 4 is a right side view thereof.
Figure 5:
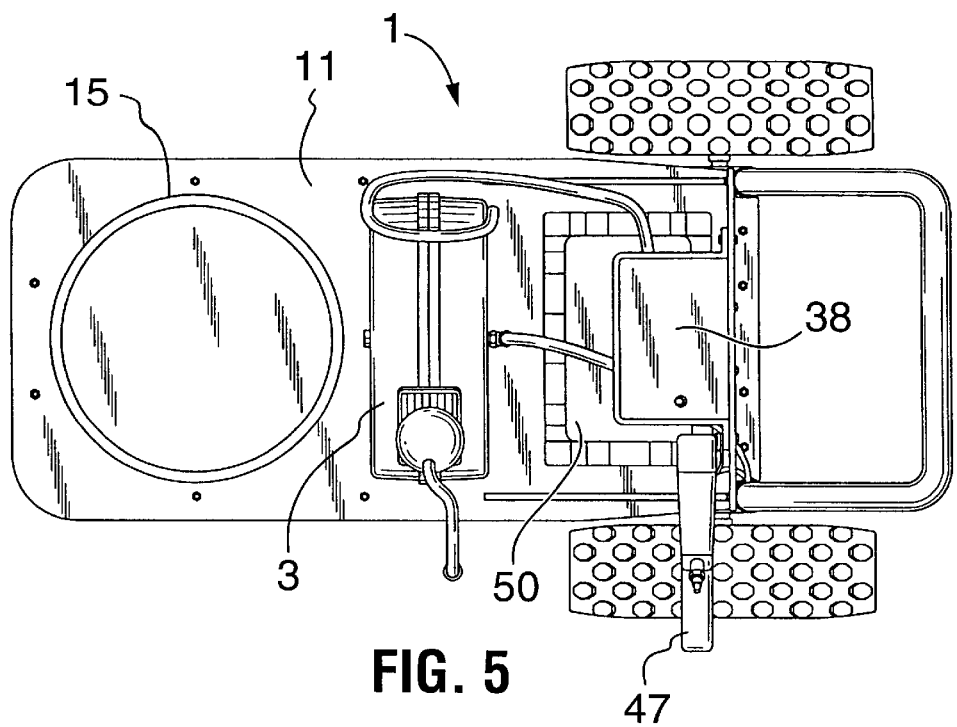
FIG. 5 is a top plan view thereof.
Figure 6:
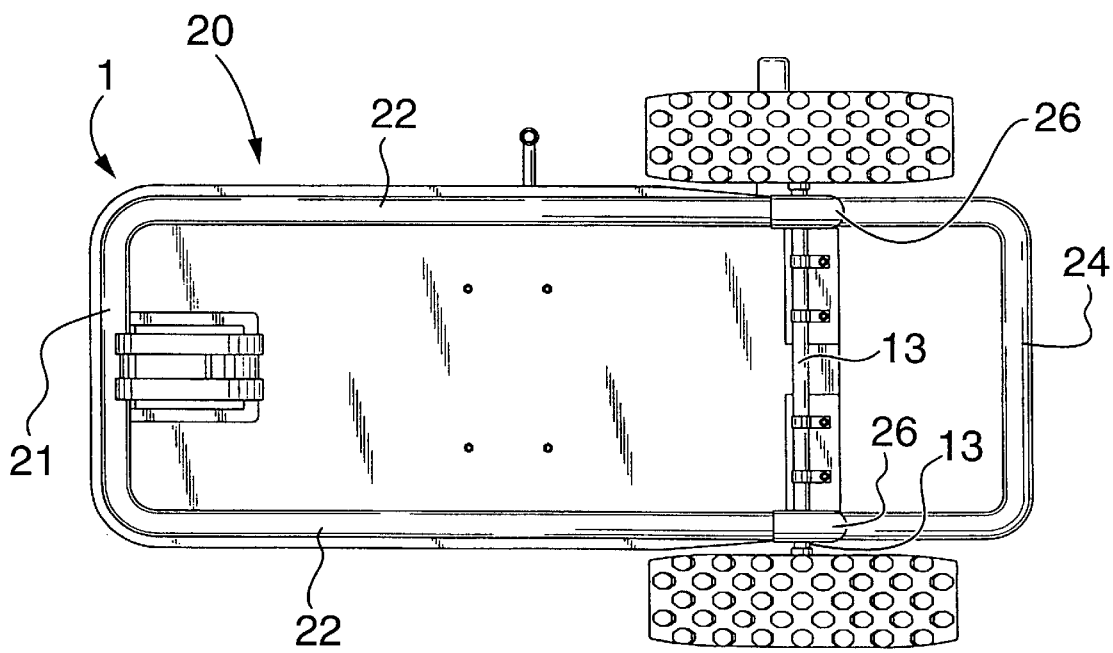
FIG. 6 is a bottom plan view thereof.
Figure 7:
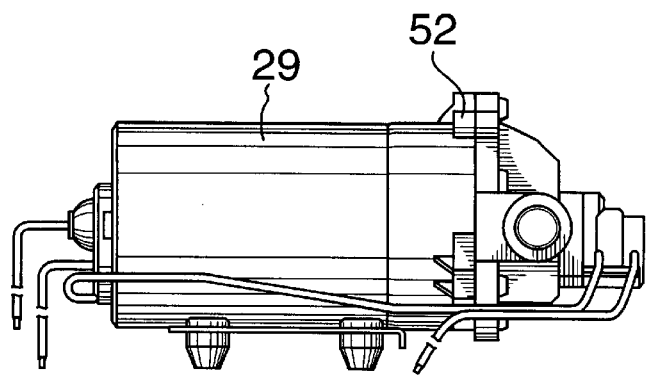
FIG. 7 is a plan view showing the motor and pump of the present invention.

One end 23 of hose 37 from the reel is connected to the discharge end of a pump of an electric motor and pump assembly such as set forth and described in FIGS. 14–15 providing a selected pressure of from about 60 to 100 psig. of solution The free end 25 of the hose 37 extending from the suction end of the pump as shown best in FIGS. 1 and 3 is bucket of spry solution. While separate motor and pump assemblies can be supplied to run off of AC or DC current, the preferred embodiment utilizes a single motor and pump with a switching device to switch from AC to DC current in order to minimize weight of the unit. The motor 29, pump 52, transformer such as incorporated within a conventional battery charger 50, and AC/DC switch as best shown in FIGS. 11 and 13, are held in a water proof control unit case 38 attached to a plate 40 extending between the upper portions of the vertical longitudinal members 28. The pump is a demand pump activated by a simple toggle switch. The other end 42 of the hose 37 extending from the pump discharge is fed into the hose reel 3. The free distal end 27 of the hose 43 extending from the reel 3 is fitted with a quick disconnect coupling 44 which is cooperatively engagable with a mating quick disconnect coupling 45 extending from the handle 47 of the trigger spray gun 46 as described in detail in FIG. 12. An adjustable cone, flat spread pattern, fan tip, or zero degree focused pin point spray nozzles are removably attached to the end of the coupling to product a fine mist, straight stream or variations thereinbetween. The pump will pump up to 150 pounds, preferably the range of from 60 to 100 psig is used to pump cleaners, detergents, sealers, caustic or acid solutions depending upon the application. Flow rates up to 2.0 gallons per minute, and typically from 0.1 to 1.6 gallons per minutes are usual for cleaners and sealers. The sprayer will spray up to 50 feet depending on the environmental conditions; however, 30 feet is typical for applications involving building, gutter, and roof cleaning applications.

The electric pump motor is either 110–115 AC or 12 volt DC operation; however, a 220 Volt motor can be employed with the unit. A battery charger unit 50 such as shown in FIG. 1 in phantom lines and on the embodiment illustrated in FIG. 9 may be employed with the unit to connect with and recharge the battery 31 as needed for use in the DC operation. The unit's battery can be charged while in use in the DC mode by plugging in the charger to a 110 or 115 volt electric outlet. The charger includes a manual control where the use cuts off the charger and an automatic mode wherein the charger cuts off the AC current upon the battery reaching a preset full charge. The preferred embodiment utilizes a 10 amp fast charge with automatic shutoff.

The pump is a positive displacement three chamber diaphragm pump using a 2-way check valve preventing reverse flow and up to six foot head forward flow. It utilizes a 3 degree cam and permanent magnets. A pressure switch having an adjustable shut off ranging from 80 to 100 psi is utilized with the preferred embodiment. The pump is self priming and can pump solutions up to 180° F.

The operation of the control unit consists of an "off" mode wherein the sprayer unit is idle; a charger mode wherein the battery is charged at a dual stage utilizing a high charge rate when being used and a trickle charge at rest, in AC operation the motor is operating from the transformer through a circuit which switches the AC current to DC current; and in the battery operating mode the motor is operating from the battery. Of course, the battery can be charged while in use if desired.

Figure 10:
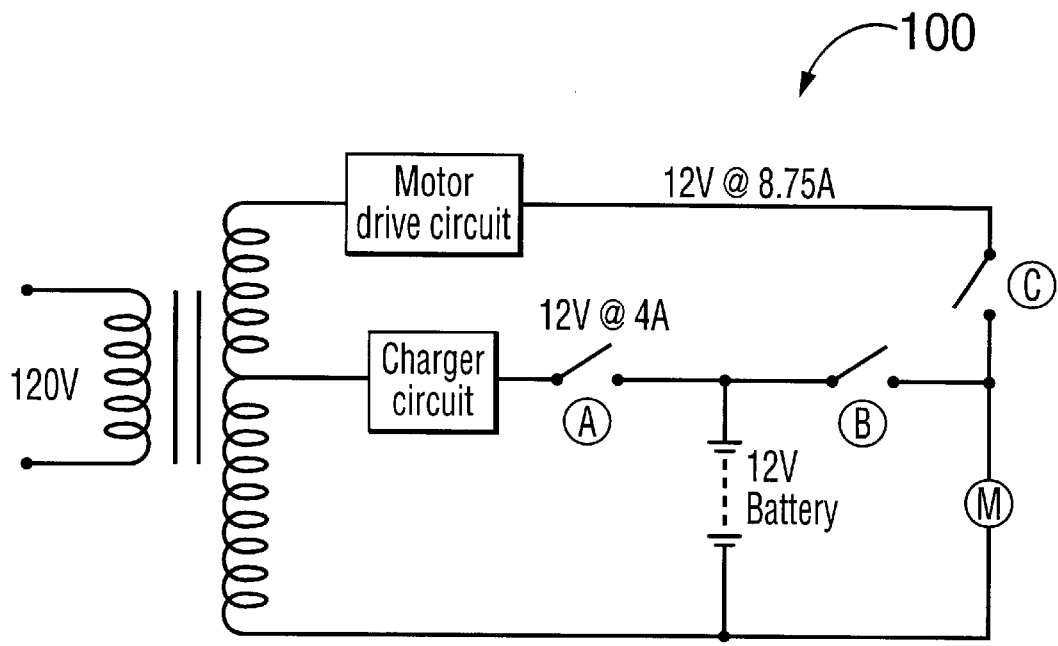
FIG. 10 is a schematic of the transformer charging system and AC/DC switch for the present invention.
Figure 10:
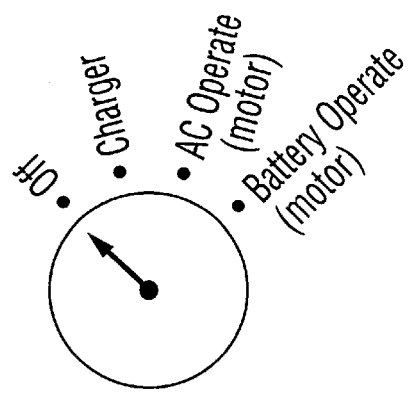

FIGS. 10 shows an alternate embodiment of a sprayer dolly unit 100 in accordance with the present invention wherein the frame is made of metal tubing and sheet metal.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

What is claimed is:

1. A sprayer dolly, comprising:
   a frame entirely defining a base support surface and a handle extending therefrom generally normal thereto;
   a plurality of wheels attached to said frame;
   a bucket support lip mounted to said base support surface for holding a removable container on said base, support surface said removable container being supported and positioned thereby, said removable container comprising a reservoir for holding a fluid to be sprayed therefrom;
   a hose reel having hose therein;
   at least one motor;
   a battery in electrical communication with said motor
   at least one pump powered by said motor;
   means for spraying in fluid communication with said hose extending from said hose reel; and
   said at least one pump being in fluid communication with said hose reel hose and in fluid communication with the fluid in said container.

2. The sprayer dolly of claim 1, wherein said frame comprises a polymer material.

3. The sprayer dolly of claim 1, wherein at least one of said plurality of wheels comprises a swivel caster.

4. The sprayer dolly of claim 1, wherein at least one of said plurality of wheels includes means of locking for limiting rotational movement thereof.

5. The sprayer dolly of claim 1, wherein said pump can run in AC or DC mode.

6. The sprayer dolly of claim 1, wherein said hose reel is retractable.

7. The sprayer dolly of claim 1, wherein said hose reel is manually operated by the user.

8. The sprayer dolly of claim 1, including a retractable electric cord.

9. The sprayer dolly of claim 1, wherein said at least one motor runs off of AC current.

10. The sprayer dolly of claim 1, wherein said at least one motor runs off of DC current.

11. The sprayer dolly of claim 1, including a transformer and means for switching from AC to DC current for providing power to said at least one motor.

12. The sprayer dolly of claim 1, including a battery charger comprising a transformer, means for switching from AC to DC current, and for charging said battery during storage or during use.

13. The sprayer dolly of claim 1, wherein said at least one motor includes a motor running off of DC current and a motor running off of AC current for powering said at least one pump.

14. The sprayer dolly of claim 1, wherein said means for spraying comprises a removable sprayer having a handle and an adjustable nozzle selected from the group consisting of an adjustable cone nozzle, a flat spread pattern nozzle, a fan tip nozzle, and a zero degree focused pin point spray nozzle for producing a fine mist, straight stream, or variations thereinbetween.

15. A sprayer dolly, comprising:
a frame entirely defining a base support surface and a handle extending therefrom generally normal thereto;
a plurality of wheels attached to said frame;
means for holding a removable container on said base, support surface said removable container being supported and positioned thereby, said removable container comprising a reservoir for holding a fluid to be sprayed therefrom;
a hose reel having hose therein;
a motor;
a battery in electrical communication with said motor;
a pump mounting to said frame;
means for spraying in fluid communication with a portion of hose extending from said hose reel; and
said pump being in fluid communication with said hose reel hose and in fluid communication with the fluid in said container.

16. The sprayer dolly of claim 15, wherein said frame comprises a polymer material.

17. The sprayer dolly of claim 15, wherein at least one of said plurality of wheels comprises a swivel caster.

18. The sprayer dolly of claim 15, wherein at least one of said plurality of wheels includes means of locking for limiting rotational movement thereof.

19. The sprayer dolly of claim 15, wherein said pump can run in AC or DC mode.

20. The sprayer dolly of claim 15, wherein said hose reel is retractable.

21. The sprayer dolly of claim 15, wherein said hose reel is manually operated by the user.

22. The sprayer dolly of claim 15, including a retractable electric cord.

23. The sprayer dolly of claim 15, wherein said at least one motor runs off of AC current.

24. The sprayer dolly of claim 15, wherein said at least one motor runs off of DC current.

25. The sprayer dolly of claim 15, including a transformer and means for switching from AC to DC current for providing power to said at least one motor.

26. The sprayer dolly of claim 15, including a battery charger comprising a transformer, means for switching from AC to DC current, and for charging said battery during storage or during use.

27. The sprayer dolly of claim 15, wherein said at least one motor includes a motor running off of DC current and a motor running off of AC current for powering said at least one pump.

28. The sprayer dolly of claim 15, wherein said means for spraying comprises a removable sprayer having a handle and an adjustable nozzle selected from the group consisting of an adjustable cone nozzle, a flat spread pattern nozzle, a fan tip nozzle, and a zero degree focused pin point spray nozzle for producing a fine mist, straight stream, or variations thereinbetween.

29. The sprayer dolly of claim 15, wherein said means for holding a removable container on said base comprises at a projection formed integrally with said base support surface.

30. The sprayer dolly of claim 15, wherein said means for holding a removable container on said base support surface comprises a circular projection affixed to said base support surface.

31. The sprayer dolly of claim 15, wherein said means for holding a removable container on said base support surface comprises a ring affixed to said base support surface.

32. The sprayer dolly of claim 15, wherein said means for holding a removable container on said base support surface comprises a circular projection defining side walls affixed to said base support surface.

33. A sprayer dolly, comprising:
a frame entirely defining a base support surface and a handle extending therefrom generally normal thereto;
a plurality of wheels attached to said frame;
means for holding a removable container on said base, support surface said removable container being supported and positioned thereby, said removable container comprising a reservoir for holding a fluid to be sprayed therefrom;
a hose reel having hose therein;
a motor;
means for providing power in electrical communication with said motor;
a transformer for selectively converting AC current to DC current and means for connecting to an AC power supply;
a pump powered by said motor;
a removable spray gun in fluid communication with a portion of hose extending from said hose reel; and
said pump being in fluid communication with said hose reel hose and in fluid communication with the fluid in said container.

34. The sprayer dolly of claim 33, wherein said means for providing power is a battery.

35. The sprayer dolly of claim 33, wherein said frame comprises a polymer material.

36. The sprayer dolly of claim 33, wherein at least one of said plurality of wheels comprises a swivel caster.

37. The sprayer dolly of claim 33, wherein at least one of said plurality of wheels includes means of locking for limiting rotational movement thereof.

38. The sprayer dolly of claim 33, wherein said pump can run in AC or DC mode.

39. The sprayer dolly of claim 33, wherein said hose reel is retractable.

40. The sprayer dolly of claim 33, wherein said hose reel is manually operated by the user.

41. The sprayer dolly of claim 33, wherein said removable spray gun comprises a handle and an adjustable nozzle selected from the group consisting of an adjustable cone nozzle, a flat spread pattern nozzle, a fan tip nozzle, and a zero degree focused pin point spray nozzle for producing a fine mist, straight stream, or variations thereinbetween.

42. The sprayer dolly of claim 33, wherein said means for holding a removable container on said base support surface comprises at a projection formed integrally with said base support surface.

43. The sprayer dolly of claim 33, wherein said means for holding a removable container on said base support surface comprises a circular projection affixed to said base support surface.

44. The sprayer dolly of claim 33, wherein said means for holding a removable container on said base support surface comprises a ring affixed to said base support surface.

45. The sprayer dolly of claim 34, wherein said means for holding a removable container on said base support surface comprises a circular projection defining side walls affixed to said base support surface.

46. A sprayer dolly, comprising:
a frame entirely defining a base support surface and a handle extending therefrom generally normal thereto;
a plurality of wheels attached to said frame;
means for holding a removable container on said base, support surface said removable container being supported and positioned thereby, said removable container comprising a reservoir for holding a fluid to be sprayed therefrom;

a hose reel having hose therein;

a motor;

means for providing electrical power in electrical communication with said motor;

a pump mounting to said frame;

means for spraying in fluid communication with a portion of hose extending from said hose reel; and said pump being in fluid communication with said hose reel hose and in fluid communication with the fluid in said container.

47. The sprayer dolly of claim 46, wherein said means for providing power is a battery.

48. The sprayer dolly of claim 46, wherein said frame comprises a polymer material.

49. The sprayer dolly of claim 46, wherein at least one of said plurality of wheels comprises a swivel caster.

50. The sprayer dolly of claim 46, wherein at least one of said plurality of wheels includes means of locking for limiting rotational movement thereof.

51. The sprayer dolly of claim 46, wherein said pump can run in AC or DC mode.

52. The sprayer dolly of claim 46, wherein said hose reel is retractable.

53. The sprayer dolly of claim 46, wherein said hose reel is manually operated by the user.

54. The sprayer dolly of claim 46, wherein said means for spraying comprises a removable spray gun including a handle and an adjustable nozzle selected from the group consisting of an adjustable cone nozzle, a flat spread pattern nozzle, a fan tip nozzle, and a zero degree focused pin point spray nozzle for producing a fine mist, straight stream, or variations thereinbetween.

55. The sprayer dolly of claim 46, wherein said means for holding a removable container on said base comprises at a projection formed integrally with said base support surface.

56. The sprayer dolly of claim 46, wherein said means for holding a removable container on said base support surface comprises a circular projection affixed to said base.

57. The sprayer dolly of claim 46, wherein said means for holding a removable container on said base comprises a ring affixed to said base support surface.

58. The sprayer dolly of claim 46, wherein said means for holding a removable container on said base support surface comprises a circular projection defining side walls affixed to said base.

59. The sprayer dolly of claim 46, including a transformer and means for switching from AC to DC current for providing power to said at least one motor.

* * * * *